United States Patent [19]
Ramcke et al.

[11] Patent Number: 5,834,530
[45] Date of Patent: Nov. 10, 1998

[54] PLATE-SHAPED RUBBER MEMBER CONSISTING OF A PRE-CROSSLINKED RUBBER MIXTURE

[75] Inventors: Uwe Ramcke, Walrode; Werner Bosch, Garbsen, both of Germany

[73] Assignee: Autoliv Development AB, Vargarda, Sweden

[21] Appl. No.: 684,444

[22] Filed: Jul. 19, 1996

[51] Int. Cl.$^6$ .................. C08F 2/48; C08F 2/54; C08C 4/00

[52] U.S. Cl. .................. 522/157; 522/158; 522/159; 522/160; 522/161; 264/485; 264/494; 428/195; 428/492; 428/493

[58] Field of Search .................. 428/195, 492, 428/493; 522/157, 158, 159, 160, 161; 427/400; 264/485, 494

[56] References Cited

U.S. PATENT DOCUMENTS

| | | | |
|---|---|---|---|
| 4,089,360 | 5/1978 | Bohm | 152/330 R |
| 4,098,935 | 7/1978 | Knudsen | 428/40 |
| 4,102,761 | 7/1978 | Bohm et al. | 522/158 |
| 4,122,137 | 10/1978 | Bohm et al. | 522/158 |
| 5,358,772 | 10/1994 | Nakagawa et al. | 428/148 |
| 5,527,407 | 6/1996 | Gartland et al. | 156/64 |

*Primary Examiner*—Susan W. Berman
*Attorney, Agent, or Firm*—Robert W Becker & Associates

[57] ABSTRACT

A plate-shaped rubber member consists of at least one rubber mixture. The rubber member has a surface with markings and includes a pre-crosslinked layer directly below the surface at least in the area of the markings. The pre-crosslinked layer is generated by exposure of the surface of the rubber member to electromagnetic radiation or electron beam radiation.

10 Claims, 1 Drawing Sheet

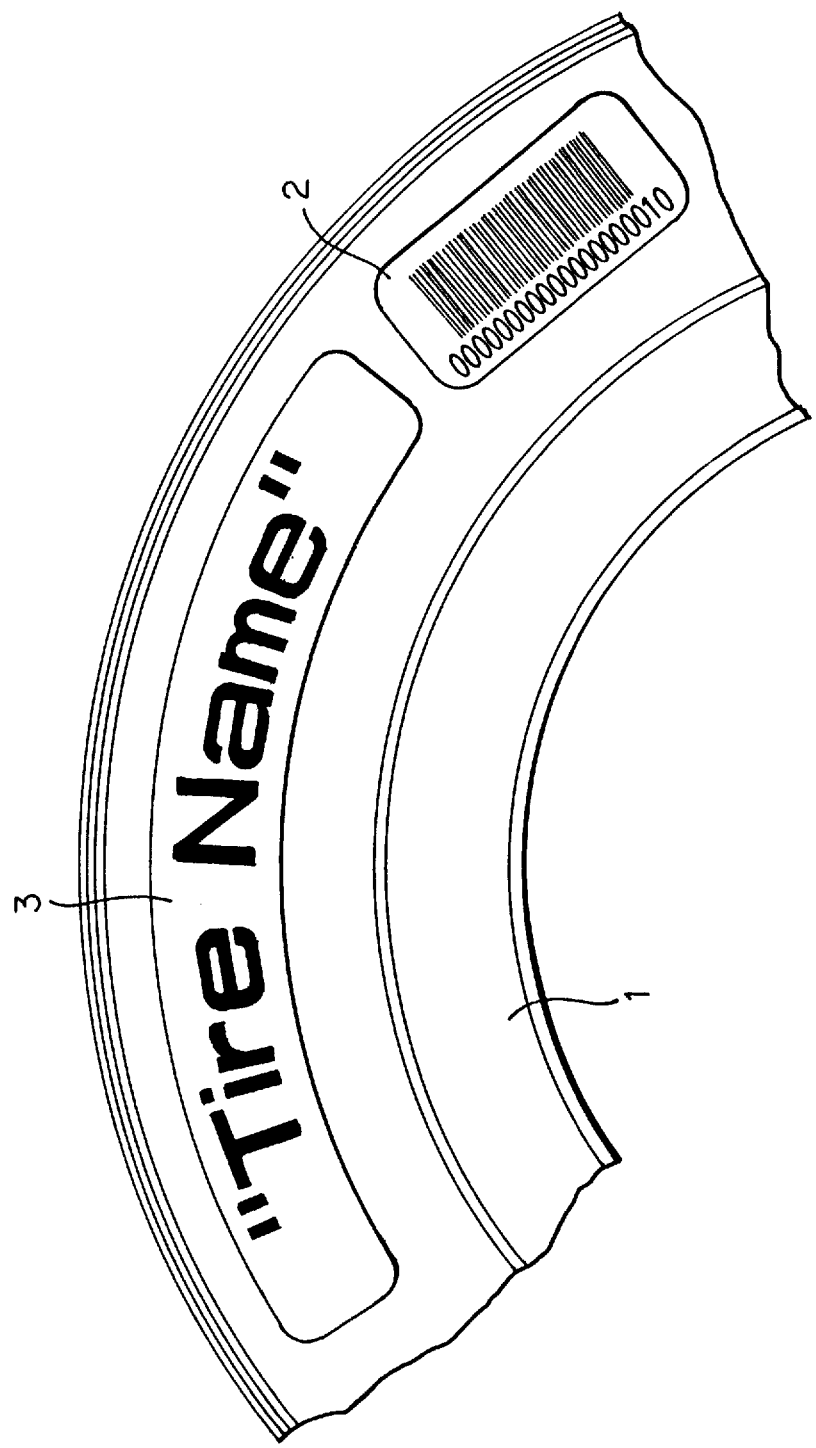

PLATE-SHAPED RUBBER MEMBER CONSISTING OF A PRE-CROSSLINKED RUBBER MIXTURE

BACKGROUND OF THE INVENTION

The present invention relates to a plate-shaped rubber member comprised of a rubber mixture having markings at an upper surface thereof.

For identification purposes rubber articles (tires, air springs, drive belts etc.) are provided with markings indicating the dimensions etc., whereby the markings in the context of the present invention include letters, bar codes, numbers, symbols, pictures etc. The application of markings is, in general, performed in the vulcanization mold whereby the markings are either directly imprinted by the metallic walls of the vulcanization mold into the rubber article or, especially in the case of colored markings, are produced by inserting rubber members into the vulcanization mold. The markings are then visible after vulcanization on the finished rubber article. However, there is a need to be able to read the markings, especially bar codes, as an identification means, before the vulcanization step, for example, in order to be able to introduce a green tire of a certain dimension into the proper vulcanization mold.

It is already known to apply markings onto the surface of a rubber member (rubber plate) and to attach the rubber member within or outside of the vulcanization mold to the unvulcanized green rubber article. During vulcanization, the rubber member is chemically bonded to the green article. Due to the conditions (temperature greater than 150° C., pressure) present during vulcanization, the surface of the rubber member with the markings is subject to flowing which can result in a distortion of the markings or even in destruction of the markings so that they can no longer be read.

Therefore, various attempts have been made to stop this flowing during vulcanization by applying below the surface of the rubber member a fabric layer. This variant has the disadvantage that no sufficient adhesion between the rubber article and the rubber member can be achieved because the fabric layer impairs at the lateral edges of the rubber member a fixed and permanent bonding between the green article and the rubber member.

It has been suggested in the past to prevulcanize the rubber member in an auxiliary vulcanization mold. However, this resulted, especially in connection with tires where the rubber members are positioned on highly loaded sidewalls, in the disadvantage that the edges of the rubber member during vulcanization of the tire will not achieve a sufficient chemical bonding to the tire. This can result in a premature fissure at these locations during operation of the tire.

It is therefore an object of the present invention to provide rubber members for identifying articles made of rubber (tires, air springs, drive belts etc.) which can be easily read before and after vulcanization and which are fixedly and permanently attached to the rubber article.

SUMMARY OF THE INVENTION

The plate-shaped rubber member comprised of at least one rubber mixture according to the present invention is primarily characterized by the rubber member having a surface with markings and comprising a pre-crosslinked layer directly below the surface at least in the area of the markings, wherein the pre-crosslinked layer is generated by exposure of the surface of the rubber member to electromagnetic radiation or electron beam radiation.

Advantageously, the rubber member has lateral edges and the pre-crosslinked layer extends over the entire area of the rubber member to the lateral edges.

Preferably, the rubber member has a thickness perpendicular to the surface and the pre-crosslinked layer extends over up to 80% of the depth.

Preferably, the pre-crosslinked layer is generated by electron beam radiation at energy levels of 200 to 500 keV.

Preferably, the rubber member consists of only one rubber mixture.

Advantageously, the pre-crosslinked layer is generated after applying the markings to the surface.

In a preferred embodiment of the present invention the rubber member further comprises a protective foil positioned on the surface.

The present invention also relates to a method for manufacturing a plate-shaped rubber member comprised of at least one rubber mixture, wherein according to the present invention the method is primarily characterized by the following steps:

Preparing a plate-shaped unvulcanized rubber base body;

Applying markings to a surface of the rubber base body;

Irradiating the surface of the rubber base body to form a pre-crosslinked layer below the surface at least in the area of the markings with electromagnetic radiation or electron beam radiation, wherein heat evolution in the area of the markings is substantially avoided.

The present invention also relates to a first method for manufacturing a rubber article including a plate-shaped rubber member, the method according to the present invention primarily characterized by the steps of:

Preparing a green rubber article;

Introducing the green rubber article into a vulcanization mold;

Preparing a plate-shaped rubber member having a surface with markings;

Generating a pre-crosslinked layer directly below the surface of the rubber member at least in the area of the markings by exposure of the surface of the rubber member to electromagnetic radiation or electron beam radiation;

Attaching the plate-shaped rubber member with the pre-crosslinked layer to the green article;

Vulcanizing the green article together with a plate-shaped rubber member.

The present invention also relates to a second method for manufacturing a rubber article including a plate-shaped rubber member which in the second embodiment is primarily characterized by:

Preparing a green rubber article;

Preparing a plate-shaped rubber member having a surface with markings;

Generating a pre-crosslinked layer directly below the surface of the rubber member at least in the area of the markings by exposure of the surface of the rubber member to electromagnetic radiation or electron beam radiation;

Attaching the plate-shaped rubber member with the pre-crosslinked layer to the green article;

Introducing the green rubber article together with the attached plate-shaped rubber member into a vulcanization mold;

Vulcanizing the green article together with a plate-shaped rubber member.

The invention also relates to a rubber article prepared by vulcanizating a green rubber article having attached thereto a plate-shaped rubber member with a surface having markings. The plate-shaped rubber member before vulcanization comprises a pre-crosslinked layer below the surface, at least in the area of the markings, which is produced by exposure of the surface of the rubber member to electromagnetic radiation or electron beam radiation.

Thus, according to the present invention, the plate-shaped rubber member is pre-crosslinked at least in the area of the markings directly below the surface with electromagnetic or electron beam radiation acting on the surface of the plate-shaped rubber member.

With the radiation-initiated crosslinking, it is possible that, due to the penetration depth of the radiation thin layers within the rubber member can be crosslinked and at the same time the degree of crosslinking of the polymer can be influenced by varying a defined application of energy onto the rubber member to be crosslinked. Possible radiation types are, for example, gamma rays, ultraviolet (uv) radiation, or high energy electron beam radiation. In principle, such radiation is suitable for the pre-crosslinking of the inventive plate-shaped rubber members which causes as little as possible of an uncontrolled heating of the plate-shaped rubber member because, otherwise, a complete vulcanization of the entire plate-shaped rubber member would have to be expected.

With the application of radiation energy, crosslinking can be performed via the carbon-carbon bridges. Since crosslinking by radiation can be initiated by cleavage of carbon-carbon single bonds and, since furthermore, crosslinking occurs only within a thin layer thickness, the remaining rubber material can be, for example, by prior addition of vulcanization systems and under the influence of heat, completely vulcanized. The inventive plate-shaped rubber members have the advantage that, on the one hand, with the step of pre-crosslinking flowing of the plate-shaped rubber member surface during vulcanization with a rubber article is reduced, respectively, avoided, due to the more stable support structure and, on the other hand, a further vulcanization, for example, with sulfur is still possible. The sulfur-based vulcanization is especially beneficial at locations of the plate-shaped rubber member at which the plate-shaped rubber member chemically bonds to the rubber article (lateral edges, underside of the plate-shaped rubber member) and thus permanently adheres to the rubber article.

Furthermore, with the inventive radiation crosslinking of the plate-shaped rubber members it is achieved that the markings are readable before as well as after vulcanization. This makes obsolete additional markings of the rubber article and the thus entailed further working steps. It also avoids possible data loss.

It is sufficient that pre-crosslinking occurs only in the area of the plate-shaped rubber member in which markings are provided. The markings are applied to the upper surface of the plate-shaped rubber member, for example, with colored markings or by laser.

It is especially advantageous when the pre-crosslinked layer extends over the entire area of the rubber member to the lateral edges. With respect to technological aspects of the pre-crosslinking process this arrangement is realizable in a very simple manner.

Depending on the desired specifications, the layer thickness of the pre-crosslinked layer of the plate-shaped rubber member can vary. It is advantageous when up to 80% of the total thickness of the rubber member is pre-crosslinked. In this context it should be noted that the total thickness of the rubber member should be identical to the one of conventional rubber members used for the disclosed purpose.

When pre-crosslinking is carried out with electron beam radiation, it is favorable when the electron beam has an energy output of between 200 to 500 keV.

In principle it is possible to apply the markings before or after pre-crosslinking to the plate-shaped rubber member. However, it is more favorable with respect to production-technological considerations to apply the markings after the pre-crosslinking step.

The inventive plate-shaped rubber members have the advantage relative to those of the prior art that they can be comprised of one single rubber mixture. Thus, complicated mixing and doubling processes are obsolete. In principle, it is also possible that the plate-shaped rubber member is comprised of a plurality of rubber mixtures. For example, it is feasible that the layer to be pre-crosslinked is comprised of a different rubber mixture than the remaining plate-shaped rubber member material.

The rubber material for the inventive plate-shaped rubber members can be selected from all natural and/or synthetic rubber types (for example, SBR, BR, IR etc.) and/or mixtures thereof which can be radiation crosslinked.

By applying radiation crosslinking, it is possible that the immediate surface of the plate-shaped rubber member is excluded from pre-crosslinking.

When the crosslinking density is plotted as a function of the thickness of the plate-shaped rubber member a Gaussian function results. Thus, it can be presupposed, that in the direct vicinity of the surface and in the vicinity of the underside no pre-crosslinking takes place. By varying the applied amount of energy required for generating the energy-rich electron beam radiation, it is also possible to influence the course of the curve (crosslinking density=f (thickness of rubber member)). When the direct vicinity of the surface is not pre-crosslinked, it is especially advantageous that in this state it still comprises a certain stickiness and this property allows for the application of a protective foil, for example, made of plastic material, especially a colorless or transparent plastic material. This protective foil can be attached to the plate-shaped rubber member before vulcanization together with the rubber article so that the markings during vulcanization, in which the pre-crosslinked rubber member is bonded to the unvulcanized rubber article and both are vulcanized to completion together, is not soiled or damaged. After vulcanization the protective foil can then easily be removed from the markings.

The manufacture of the inventive plate-shaped rubber member is carried out such that onto an unvulcanized rubber plate markings are applied in a manner known per se, that the rubber member at least in the area of the markings at the surface is irradiated with electromagnetic or electron beam radiation of such intensity that at least the area directly below the surface of the upper side is pre-crosslinked whereby heat evolution in this area is substantially prevented.

Since heat evolution favors sulfur vulcanization, as has been mentioned before, it should be avoided during radiation crosslinking. Otherwise, the rubber member would already completely vulcanize upon exposure to radiation up to the lateral edges which would result in the disadvantages already mentioned in connection with the prior art.

During manufacture of a rubber article, for example, tires, air springs, drive belts, it is possible to place the inventive plate-shaped rubber members before or after introduction of the rubber article into the vulcanization mold (vulcanization device).

It is especially advantageous when the green article, for example, a green tire, is already provided directly after building with the inventive plate-shaped rubber member containing the information with regard to the dimensions of the green tire in its markings. By doing so, it is possible to transport the green tire with the aid of an automated fabrication control, for example, to a respective designated vulcanization mold. After vulcanization the same inventive rubber member which serves also for identification of the finished tire, for example, allows for the automated transport of the finished tire to a storage facility, respectively, it also provides information with regard to the supplies of the tire storage facility.

With the inventive plate-shaped rubber member it is thus possible to save time, material, and personnel costs.

In the following table a rubber mixture is provided which can be advantageously used for producing the inventive plate-shaped rubber member.

| Component | Parts by Weight |
| --- | --- |
| Natural Rubber | 20 |
| Styrene-Butadiene-Rubber (SBR) | 80 |
| Carbon Black | 45 |
| Activators (Zinc Oxide, Stearic Acid) | 6 |
| Oils, Resins | 3 |
| Anti-Aging Components | 3 |
| Chemicals (Sulfur, Accelerators, Inhibitors) | 3 |

BRIEF DESCRIPTION OF THE DRAWING

The objects and advantages of the present invention will appear more clearly from the following specification in conjunction with the accompanying drawing in which a tire section with a tire sidewall and rubber members applied thereto is shown.

DESCRIPTION OF THE PREFERRED EMBODIMENTS

The present invention will now be described in detail with the aid of a specific embodiment utilizing the only FIGURE.

The only FIGURE shows a tire section with a tire sidewall 1 and plate-shaped rubber members 2 and 3 applied thereto. At the upper surface of the plate-shaped rubber member 2 markings in the form of a bar code have been applied before performing electron beam pre-crosslinking. The rubber member 3 has been provided with letters by color application on the sidewall which provides a colored contrast to the sidewall. The crosslinking initiated by electron beam radiation begins directly below the surface of the upper side of the rubber member and extends to about half of the total thickness of the rubber member. The total thickness of the applied rubber member can be between 0.04 and 3 mm. By vulcanization in the vulcanization mold the pre crosslinked rubber member is bonded to the sidewall of the green tire. The finished tire thus has at its sidewall 1 two rubber members 2 and 3 which contain information on the unvulcanized and vulcanized tire. This information can be easily identified and is fixedly and permanently connected to the tire.

The present invention is, of course, in no way restricted to the specific disclosure of the specification and drawings, but also encompasses any modifications within the scope of the appended claims.

What we claim is:

1. A plate-shaped rubber member consisting of at least one rubber mixture, said rubber member having a surface with markings and comprising a pre-crosslinked rubber layer directly below said surface at least in an area of said markings, wherein said pre-crosslinked rubber layer is generated by exposure of said surface of said rubber member to electromagnetic radiation or an electron beam, wherein said rubber member has a thickness perpendicular to said surface and wherein said pre-crosslinked rubber layer has a thickness of up to 80% of said thickness of said rubber member, wherein said surface and an opposed underside of said rubber member are not pre-crosslinking and are sticky.

2. A rubber member according to claim 1, wherein said rubber member has lateral edges and wherein said pre-crosslinked rubber layer extends over the entire area of said rubber member to said lateral edges.

3. A rubber member according to claim 1, wherein said pre-crosslinked rubber layer is generated by exposure to an electron beam at energy levels of 200 to 500 keV.

4. A rubber member according to claim 1, consisting of one said rubber mixture.

5. A rubber member according to claim 1, wherein said pre-crosslinked rubber layer is generated after applying said markings to said surface.

6. A method for manufacturing a plate-shaped rubber member consisting of at least one rubber mixture, said method comprising the steps of:

preparing a plate-shaped unvulcanized rubber base body;

applying markings to a surface of the rubber base body, wherein the rubber base body has a thickness perpendicular to said surface;

irradiating the surface of the rubber base body to form a pre-crosslinked rubber layer, having a thickness of up to 80% of said thickness of said rubber base body, below the surface at least in an area of said markings by electromagnetic radiation or an electron beam, wherein heat evolution in the area of the markings is substantially avoided, wherein the surface and an opposed underside of the rubber base body are not pre-crosslinked and are sticky.

7. A method according to claim 6, further including the step of applying a protective foil to the sticky surface.

8. A method for manufacturing a rubber article including a plate-shaped rubber member, said method comprising the steps of:

preparing a green rubber article;

introducing the green rubber article into a vulcanization mold;

preparing a plate-shaped rubber member having a surface with markings and having a thickness perpendicular to said surface;

generating a pre-crosslinked rubber layer, having a thickness of up to 80% of said thickness of said rubber member, directly below said surface of said rubber member at least in an area of said markings by exposure of said surface of said rubber member to electromagnetic radiation or an electron beam, wherein said surface and an opposed underside of the rubber member are not pre-crosslinked and are sticky;

attaching the sticky underside of the plate-shaped rubber member to the green article;

vulcanizing the green article together with the plate-shaped rubber member.

9. A method for manufacturing a rubber article including a plate-shaped rubber member, said method comprising the steps of:

preparing a green rubber article;

preparing a plate-shaped rubber member having a surface with markings and having a thickness perpendicular to said surface;

generating a pre-crosslinked rubber layer, having a thickness of up to 80% of said thickness of said rubber member, directly below said surface of said rubber member at least in an area of said markings by exposure of said surface of said rubber member to electromagnetic radiation or an electron beam, wherein said surface and an opposed underside of the rubber member are not pre-crosslinked and are sticky;

attaching the sticky underside of the plate-shaped rubber member to the green article;

introducing the green rubber article together with the attached plate-shaped rubber member into a vulcanization mold;

vulcanizing the green article together with the plate-shaped rubber member.

10. A rubber article prepared by vulcanizing a green rubber article having attached thereto a plate-shaped rubber member with a surface having markings, wherein said plate-shaped rubber member before vulcanization comprises a pre-crosslinked rubber layer below said surface, at least in an area of said markings, produced by exposure of said surface of said rubber member to electromagnetic radiation or an electron beam, wherein said rubber member has a thickness perpendicular to said surface and wherein said pre-crosslinked rubber layer has a thickness of up to 80% of said thickness of said rubber member such that said surface and an opposed underside of said rubber member are not pre-crosslinked and are sticky before vulcanization.

* * * * *

UNITED STATES PATENT AND TRADEMARK OFFICE
CERTIFICATE OF CORRECTION

PATENT NO. : 5,834,530
DATED : 10 November 1998
INVENTOR(S) : Uwe Ramcke, Werner Bosch It is certified that error appears in the above-indentified patent and that said Letters Patent is hereby corrected as shown below:

Title page;

[30] Foreign Application Priority Data
    July 21, 1995 [DE] Germany.......195 26 695.1

Signed and Sealed this

Twenty-fourth Day of August, 1999

Attest:

Q. TODD DICKINSON

*Attesting Officer*  *Acting Commissioner of Patents and Trademarks*